United States Patent
Taubman et al.

(10) Patent No.: US 10,635,860 B1
(45) Date of Patent: Apr. 28, 2020

(54) RESOLVING PRONOUN AMBIGUITY IN VOICE QUERIES

(71) Applicant: Google LLC, Mountain View, CA (US)

(72) Inventors: Gabriel Taubman, Brooklyn, NY (US); John J. Lee, Long Island City, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/009,529

(22) Filed: Jun. 15, 2018

Related U.S. Application Data (63) Continuation of application No. 15/386,113, filed on Dec. 21, 2016, now Pat. No. 10,019,434, which is a continuation of application No. 13/774,082, filed on Feb. 22, 2013, now Pat. No. 9,529,793.

(60) Provisional application No. 61/654,518, filed on Jun. 1, 2012, provisional application No. 61/654,742, filed on Jun. 1, 2012.

(51) Int. Cl.

| | |
|---|---|
| *G06F 17/27* | (2006.01) |
| *G06F 40/253* | (2020.01) |
| *G10L 25/87* | (2013.01) |
| *G10L 15/187* | (2013.01) |
| *G06F 16/635* | (2019.01) |
| *G06F 16/951* | (2019.01) |

(52) U.S. Cl.
CPC .......... *G06F 40/253* (2020.01); *G06F 16/635* (2019.01); *G06F 16/951* (2019.01); *G10L 15/187* (2013.01); *G10L 25/87* (2013.01)

(58) Field of Classification Search
CPC ..................................................... G06F 17/27
See application file for complete search history.

(56) References Cited

U.S. PATENT DOCUMENTS

| | | |
|---|---|---|
| 6,275,806 B1 | 8/2001 | Petrushin |
| 6,430,531 B1 | 8/2002 | Polish |
| 6,434,520 B1 | 8/2002 | Kanevsky et al. |
| 8,055,669 B1 | 11/2011 | Singhal et al. |

(Continued)

OTHER PUBLICATIONS

Cardie, Claire, "Learning To Disambiguate Relative Pronouns," Proceedings of the Tenth National Conference on Artificial Intelligence, AAAI Press © 1992, pp. 38-43, downloaded from the internet on Feb. 22, 2013, http://www.cs.corriell.edu/home/cardie/papers/aaai-92.pdf.

(Continued)

*Primary Examiner* — Shreyans A Patel
(74) *Attorney, Agent, or Firm* — Fish & Richardson P.C.

(57) ABSTRACT

Methods, systems, and apparatus, including computer programs encoded on computer storage media, for resolving ambiguity in received voice queries. An original voice query is received following one or more earlier voice queries, wherein the original voice query includes a pronoun or phrase. In one implementation, a plurality of acoustic parameters is identified for one or more words in the original voice query. A concept represented by the pronoun is identified based on the plurality of acoustic parameters, wherein the concept is associated with a particular query of the one or more earlier queries. The concept is associated with the pronoun. Alternatively, a concept may be associated with a phrase by using grammatical analysis of the query to relate the phrase to a concept derived from a prior query.

14 Claims, 6 Drawing Sheets

(56) References Cited

U.S. PATENT DOCUMENTS

| | | |
|---|---|---|
| 8,175,879 B2 | 5/2012 | Nitisaroj et al. |
| 8,204,751 B1 | 6/2012 | Di Fabbrizio et al. |
| 8,346,556 B2 | 1/2013 | Stewart et al. |
| 2003/0101047 A1* | 5/2003 | Panttaja ............... G06F 17/2785 704/9 |
| 2003/0204492 A1 | 10/2003 | Wolf et al. |
| 2004/0215449 A1 | 10/2004 | Roy |
| 2005/0134117 A1 | 6/2005 | Ito |
| 2007/0048697 A1 | 3/2007 | Du et al. |
| 2007/0174057 A1 | 7/2007 | Genly |
| 2009/0144609 A1 | 6/2009 | Liang et al. |
| 2010/0036660 A1 | 2/2010 | Bennett |
| 2010/0121638 A1 | 5/2010 | Pinson et al. |
| 2012/0265528 A1 | 10/2012 | Gruber et al. |
| 2012/0331049 A1* | 12/2012 | Deeter ................... G06Q 50/01 709/204 |

OTHER PUBLICATIONS

De Hoop, "On the Interpretation of Stressed Pronouns," Optimality Theory and Pragmatics. Palgrave Macmillan; New York: 2004, pp. 25-41.

De Hoop, Helen. On the Interpretation of Stressed Pronouns. Arbeitspapier Nr. 114 (2003): pp. 159172.

* cited by examiner

RESOLVING PRONOUN AMBIGUITY IN VOICE QUERIES

CROSS-REFERENCE TO RELATED APPLICATIONS

This application is a continuation of U.S. application Ser. No. 15/386,113, filed Dec. 21, 2016, which is a continuation of U.S. application Ser. No. 13/774,082, filed Feb. 22, 2013, which claims the benefit of U.S. Provisional Application Nos. 61/654,742 filed Jun. 1, 2012 and 61/654,518 filed Jun. 1, 2012, each of which are incorporated herein in their entirety by reference.

FIELD

This specification describes technologies related to providing information in response to user queries.

BACKGROUND

A mobile device, such as a smartphone or another portable computing apparatus, may run a search engine that receives queries, for example, from one or more users and returns query results responsive to the queries. For example, the search engine run by the mobile device can identify documents responsive to a query, generate query results with information about the documents, and provide the query results in response to the query. Other types of query results, for example, direct answers to questions posed by the user, or a summary of information responsive to the user's query, can also be provided. The usefulness of a search engine for a mobile device can depend on its ability to provide satisfactory query results.

SUMMARY

In general, one innovative aspect of the subject matter described in this specification can be embodied in methods that include the actions of receiving an original voice query, identifying a plurality of acoustic parameters associated with a pronoun included in the original voice query, identifying a concept represented by the pronoun based on the plurality of acoustic parameters, such that the concept is derived from a particular query of one or more earlier queries received before receiving the original voice query, and associating the concept with the pronoun.

Another innovative aspect of the subject matter described in this specification can be embodied in methods that include receiving an original voice query after having received one or more earlier voice queries, wherein the original voice query includes a phrase that refers to a concept from one of the earlier voice queries, analyzing the grammatical structure of the original query to extract the phrase that refers to a concept from one of the earlier voice queries, extracting a determiner word from the phrase, identify an object word of the determiner word from the phrase, finding a set of hypernyms for the object word, identifying a concept represented by the phrase, wherein the concept is derived from a particular query of the one or more earlier queries, by comparing the one or more earlier queries to the phrase and the set of hypernyms, and associating the concept with the phrase.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In particular, one implementation may include all the following features in combination. The methods can further include the actions of modifying the original voice query to include the concept and presenting one or more query results that are responsive to the modified original voice query. In an implementation, the acoustic parameters may include two or more of volume, pitch, frequency, duration between each spoken word, and spoken duration. The particular query may be a most recent voice query of the one or more earlier voice queries. In an implementation, identifying the concept represented by the pronoun based on the plurality of acoustic parameters may include determining that the plurality of acoustic parameters for the pronoun indicates that the pronoun was stressed. For example, determining that the plurality of acoustic parameters for the pronoun indicates that the pronoun was stressed may include determining a stress score for the pronoun based on the plurality of acoustic parameters and determining that the stress score satisfies a predetermined threshold.

Alternatively, identifying the concept represented by the pronoun based on the plurality of acoustic parameters may include determining that the plurality of acoustic parameters for the pronoun indicates that the pronoun was not stressed. For example, determining that the plurality of acoustic parameters for the pronoun indicates that the pronoun was not stressed may include determining a stress score for the pronoun based on the plurality of acoustic parameters and determining that the stress score does not satisfy a predetermined threshold.

The subject matter described in this specification can be implemented in particular embodiments so as to realize one or more of the following advantages. The performance of existing search engines used by mobile devices can be improved. For example, pronouns in voice queries can be disambiguated. Query results based on the disambiguated pronoun can be returned to the user. By doing this, search engines can focus on finding results that are more relevant to what a searching user would like to receive.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
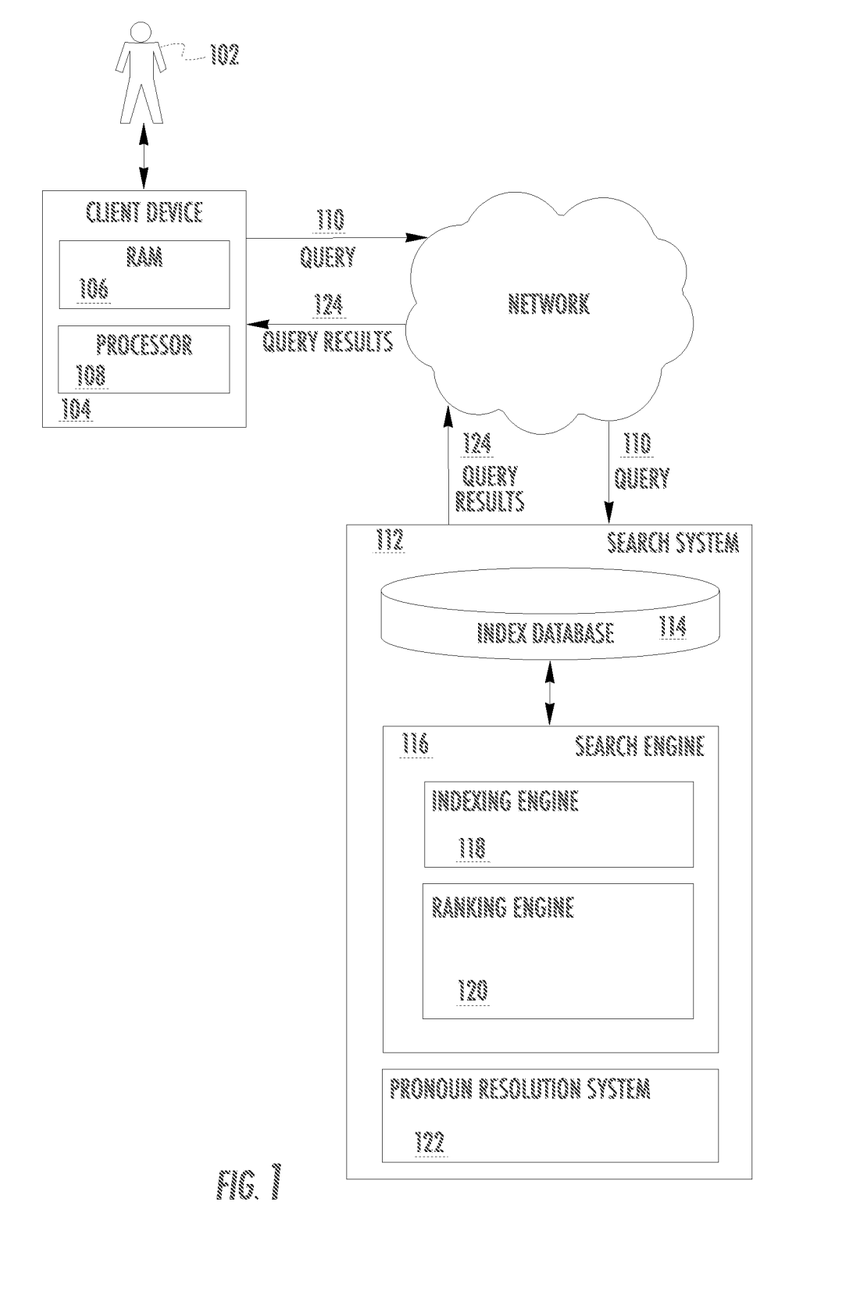
FIG. 1 illustrates an example search system for providing query results responsive to submitted queries.

FIG. 1 illustrates an example search system 112 for providing query results responsive to submitted queries as can be implemented in an internet, an intranet, or another client and server environment. The search system 112 is an example of an information retrieval system in which the systems, components, and techniques described below can be implemented. However, it will be noted that while FIG. 1 presents an implementation that is presented based on a client-server architecture, other network architectures such as a peer-to-peer architecture may be used appropriately.

A user 102 can interact with the search system 112 through a client device 104. For example, the client 104 can be a computer coupled to the search system 112 through a local area network (LAN) or wide area network (WAN), e.g., the Internet. In some implementations, the search system 112 and the client device 104 can be one machine. For example, a user can install a desktop search application on the client device 104. The client device 104 will generally include a random access memory (RAM) 106 and a processor 108. In such an implementation, the functionality is carried out locally at one machine.

A user 102 can submit a query 110 to search system 112. The query should include information that specifies what information user 102 would like search system 112 to find. For example, the query may include keywords, as well as additional search query modifiers such as Boolean operators, wildcards, and filters.

The query 110 can be submitted to search engine 116 by different methods. For example, user 102 can submit the query by speaking the query 110. An audio input device associated with client device 104 will detect the query 110 and transmit the query 110 through a network to search system 112. In such a method, the audio input is recognized. For example, keywords may be recognized from the audio input, or other search query modifiers as discussed above may be recognized from an audio query 110. Other methods of submitting queries to search engine 116 can also be performed. For example, user 102 can interact with a user interface associated with client device 104 to submit the query 110. The user interface can be any input device (e.g., keyboard, mouse, touch display device) that allows user 102 to enter query 110 into a graphical user interface of search system 112. For example, user 102 may type a query 110 into a search box. However, user 102 may also enter information about what they would like to search for, for example, by using a mouse or touch display device to enter part of the query through controls such as drop-down menus, check boxes, radio buttons, and other graphical controls that help specify query 110.

The search system 112 can be implemented as, for example, computer programs running on one or more computers in one or more locations that are coupled to each other through a network. For example, in one implementation, the search system 112 includes an index database 114, a search engine 116, and a pronoun resolution system 122. However, other implementations may include different constituent parts that perform similar functionality. The search system 112 responds to the query 110 by generating query results 124, which one or more query results 124 can be transmitted through the network to the client device 104 in a form that can be presented to the user 102.

When a voice query containing a pronoun is received by the search system 112, the pronoun resolution system 122 resolves the ambiguous pronoun by associating a concept with the pronoun based on the acoustic parameters of the received voice query, as described in more detail below with reference to FIG. 4. A concept can be a noun or subject that is referenced by the ambiguous pronoun. The voice query 110 is converted to text and modified to include the concept and sent to the search engine 116. Because the converted query includes the concept, it is no longer ambiguous and search engine 116 can work normally. Examples of how this process works are presented, below.

While the pronoun resolution system 122 is depicted as a component within search system 112, the pronoun resolution system 122 may also be implemented as, for example, computer programs running on one or more computers outside search system 112 and communicatively coupled with search system 112 through a network. The pronoun resolution system 122 transmits the resolved query to search engine 116. In one implementation, pronoun resolution system 122 uses information about acoustic parameters of query 110 and previous queries to disambiguate the pronoun in query 110. In another implementation, information about the grammatical structure of query 110 and previous queries to disambiguate the pronoun in query 110. In either case, the task performed by pronoun resolution system 122 is accomplished such that it can use information to provide clues about what the pronoun in query 110 actually corresponds to, then including that in query 110 before obtaining query results 124 by search engine 116, as will now be discussed.

Search engine 116 identifies resources that match the query. The search engine 116 can be, for example, an Internet search engine that takes action or identifies answers based on user queries, a question and answer system that provides direct answers to questions posed by the user, or another system that processes user requests. Essentially, the defining quality of search engine 116 is that it receives query 110 and provides query results 124 that are responsive in some way to query 110.

For example, the search engine 116 may also identify a particular "snippet" or section of one or more of the resources that are relevant to the query. For example to aid in such a task, search engine 116 will generally include an indexing engine 118 that indexes resources, e.g., web pages, images, or news articles on the Internet, found in a corpus, e.g., a collection or repository of content, an index database 114 that stores the index information, and a ranking engine 120, or other software, to rank the resources that match the query 110. While other architectures for search engine 116 may be used, a search engine 116 that uses index database 114 in combination with indexing engine 118, and ranking engine 120 will be able to take query 110 and provide appropriate query results 124.

The ranking engine 120 ranks query results that are responsive to the query by determining one or more signals for the query result and the query pair, determining a score for each query result, and then ranking the query results based on the received scores. Examples of signals include signals indicating relevance of the resource to the query and signals indicating the quality of the resource. In general, a signal is information that is useful in providing scoring information that can be used to provide meaningful improvement of the ranking process. Various approaches exist to obtain signal information, use the signal information to generate scores, and rank query results based on the scores. Additionally, user 102 may be able to control parameters of ranking engine 120 to help provide ranking engine 120 with additional information, as well as the query itself, that may indicate which results should be ranked the highest or filtered out. For example, user 102 may control the ranking by asking ranking engine 120 to only include query results from within the last week.

Figure 2A:
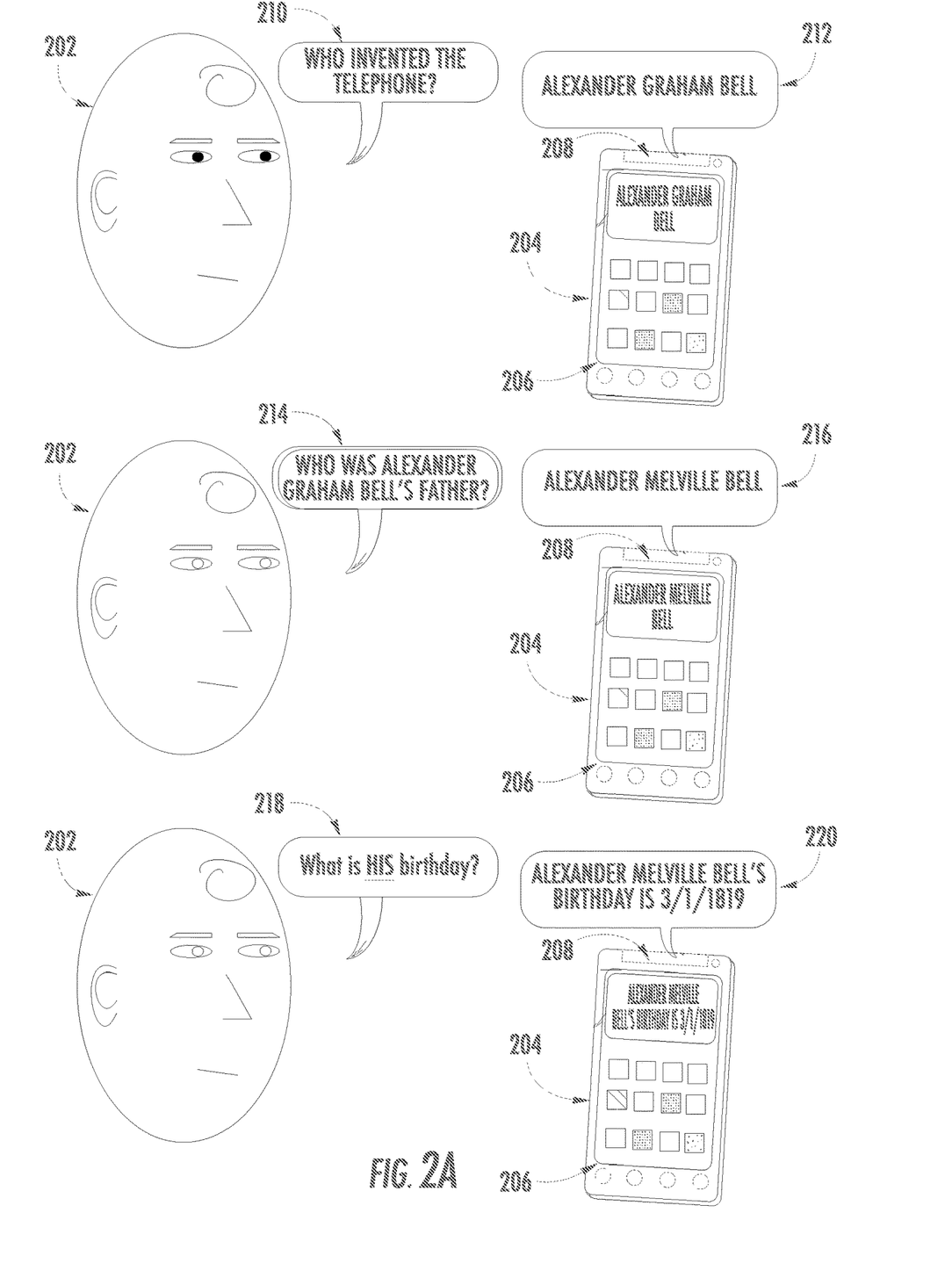
FIGS. 2A and 2B illustrate examples of resolving pronoun ambiguity to provide query results responsive to submitted queries.
Figure 2B:
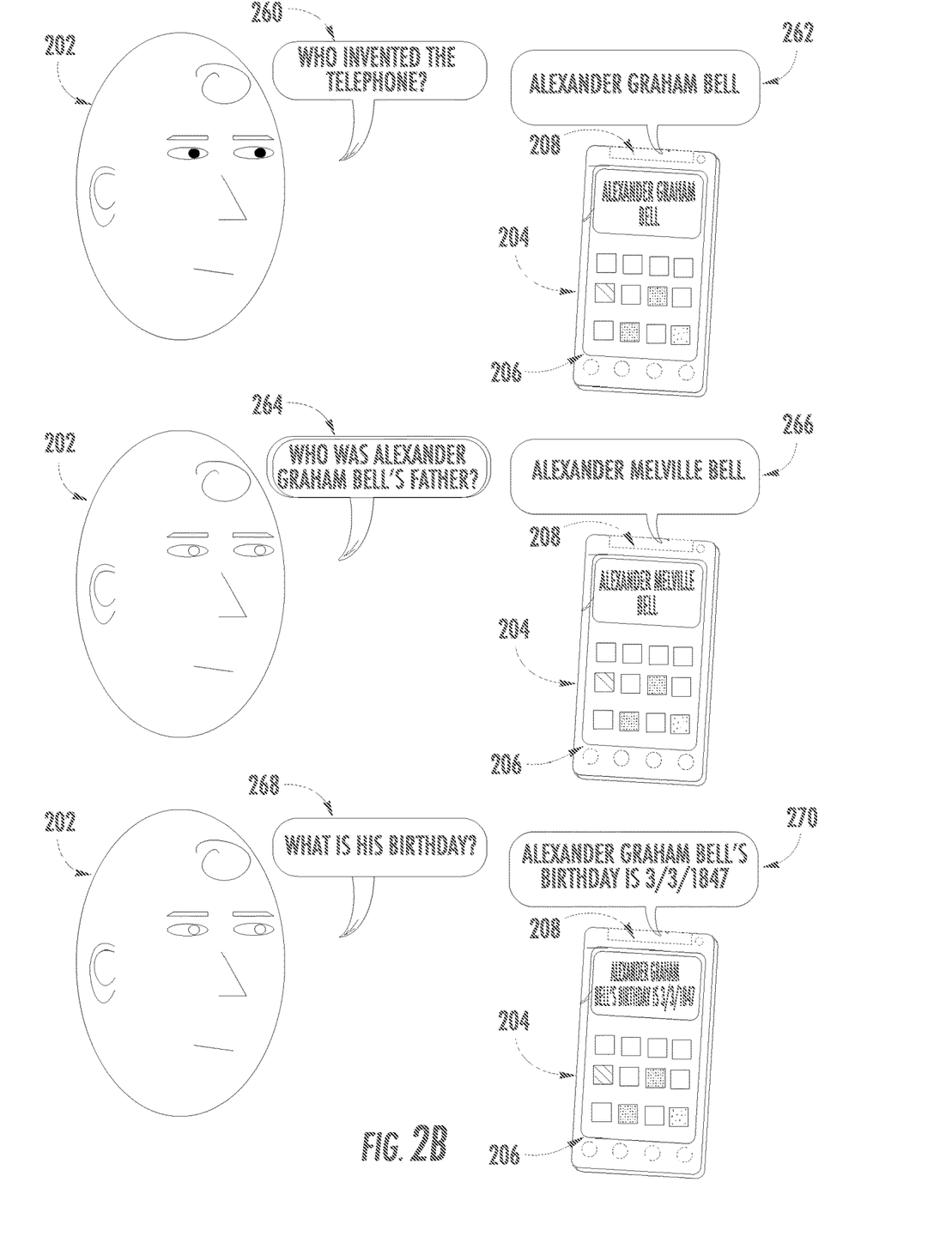

FIGS. 2A and 2B illustrate examples of resolving pronoun ambiguity to provide query results responsive to submitted queries as implemented by the search system described above with reference to FIG. 1. FIGS. 2A and 2B are presented as an example sequence of events that may occur during a typical interaction between a mobile device and a search engine in which the user incorporates a pronoun into his or her query.

In FIG. 2A, user 202 asks "Who invented the telephone?" 210. User device 204 receives the voice query 210 and responds to voice query 210 by answering, as query result, "Alexander Graham Bell" 212. Subsequently, user 202 asks "Who was Alexander Graham Bell's father?" 214. User device 204 receives the voice query 214 and responds to voice query 214 by answering "Alexander Melville Bell" 216. Subsequently, user 202 asks "What is HIS birthday?" 218. User device 204 receives voice query 218. The system identifies the term "his" in voice query 218 as a pronoun and determines that "his" was stressed when spoken by user 202. This determination may be made on the basis of acoustic parameters associated with the way user 202 pronounced the word "HIS." For example, these acoustic parameters may include information about various parts of the voice query, including parameters such as volume, pitch, frequency, duration between each spoken words, and spoken duration of words or phrases. Analyzing these acoustic parameters may allow implementations to calculate a stress score for parts of what is said. Implementations may calculate a stress score for the pronoun based on the acoustic parameters. The determination of the stress score may also be based on comparing acoustic parameters for the pronoun to acoustic parameters for other parts of the voice query. By comparing the stress score for the pronoun to a threshold, an implementation may determine that the stress score indicates that the pronoun is stressed or not.

In the case of FIG. 2A, the implementation determines that "his" was stressed. Based on the determination that "his" was stressed, the system associates "his" with the concept of the immediately preceding query, Alexander Melville Bell rather than the original query, "Alexander Graham Bell". Based on this association, the user device 204 responds to voice query 218 by answering "Alexander Melville Bell's birthday is 3/1/1819" 220.

In FIG. 2B, user 202 asks "Who invented the telephone?" 260. User device 204 receives the voice query 260 and responds to voice query 260 by answering "Alexander Graham Bell" 262. Subsequently, user 202 asks "Who was Alexander Graham Bell's father?" 264. User device 204 receives the voice query 264 and responds to voice query 264 by answering "Alexander Melville Bell" 266. Subsequently, user 202 asks "What is his birthday?" 268. User device 204 receives voice query 268. The system identifies the term "his" in voice query 268 as a pronoun and determines that "his" was not stressed when spoken by user 202. Once again, this determination is made based on acoustic parameters associated with the way the pronoun, "his," is pronounced. In this case, the acoustic parameters indicate that "his" is not stressed by user 202, so the pronoun refers to the answer to the original query, "Alexander Graham Bell", rather than the answer to the follow-up query, "Alexander Melville Bell." Based on the determination that "his" was not stressed, the system associates "his" with the concept of the original voice query, Alexander Graham Bell. Based on this association, the user device 204 responds to voice query 268 by answering "Alexander Graham Bell's birthday is 3/3/1847" 270.

FIGS. 2A and 2B illustrate user device 204 responding to user 202 voice queries by presenting answers audibly by an audio output device associated with user device, such as speaker 208, and displaying answers on active display screen 206. Alternatively, the display screen 206 may be in a low-power or no-power state. In some implementations, the answers may be presented either only audibly or only visually. These figures illustrate that an implementation can use acoustic parameters when analyzing a query, such as by comparing acoustic parameters for a pronoun to acoustic parameters for other parts of a query, to determine whether the pronoun is stressed or whether there are other clues included in how the query is articulated that reveal the intention of user 202 with respect to a pronoun. For example, if a pronoun is stressed, it may indicate that it refers to a concept from an immediately preceding query, while a pronoun that is not stress may refer to a concept from a query that occurred earlier in a series of received queries.

Figure 3:
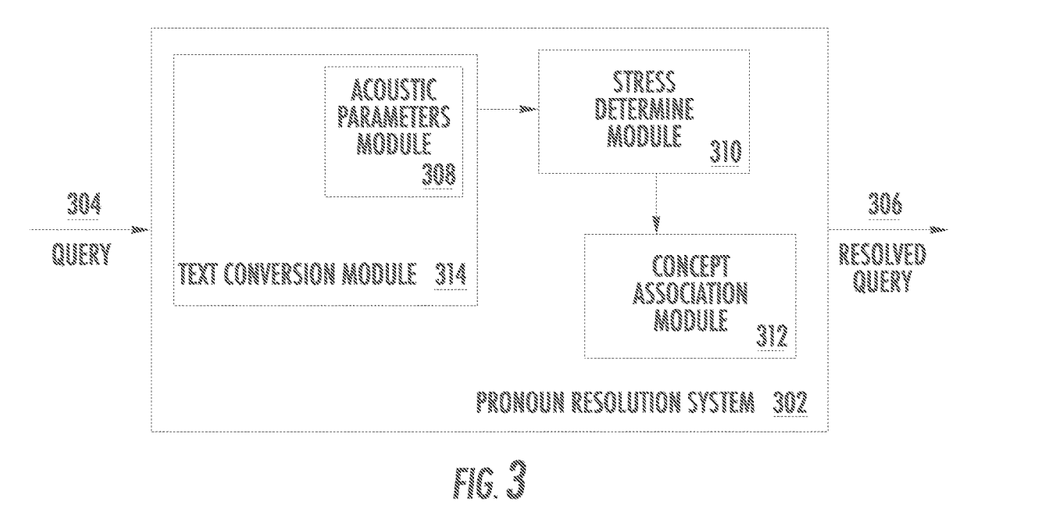
FIG. 3 illustrates an example pronoun resolution system.

FIG. 3 illustrates an example pronoun resolution system 302. The example pronoun resolution system 302 is an example of the pronoun resolution system 122 described above with reference to FIG. 1. Other implementations may use other architectures to provide similar functionality.

The pronoun resolution system 302 includes a text conversion module 314, an acoustic parameters module 308 within text conversion module 314, a stress determination module 310, and a concept association module 312. The pronoun resolution system 302 receives a query 304 containing an ambiguous pronoun and outputs a resolved query 306 containing a concept that disambiguates the pronoun.

The text conversion module 314 receives the voice query 304 and converts voice query 304 into text, for example, using conventional voice to text translation techniques. At the same time that text conversion module 314 converts voice query 304 to text, acoustic parameters module 308 identifies acoustic parameters for one or more words in voice query 304. The acoustic parameters can include the volume, frequency, and pitch of the spoken words in voice query 304. The acoustic parameters can also include the time duration between the spoken words and the time duration for the spoken words in voice query 304. In some implementations, at least two different acoustic parameters are identified for the one or more words in voice query 304.

Acoustic parameters module 308 receives voice query 304 in an audio signal waveform from a microphone associated with the user device that detects the voice query 304. The audio signal waveform is an electrical signal that represents the mechanical sound waves produced by the user when speaking voice query 304. Acoustic parameters module 308 analyzes the audio signal waveform that corresponds to voice query 304 with techniques that analyze audio signals, for example, conventional techniques such as Fast Fourier Transforms (FFTs). From the analysis, the acoustic parameters describing the voice query are identified. For example, the volume of the audio signal waveform can be determined from the amplitudes of the audio signal waveform. The frequency can be determined from the number of oscillations in the audio signal waveform in a period of time. The pitch can be determined from the frequency that describes the audio signal waveform. Other acoustic parameters can be determined by performing other appropriate mathematical analysis of the audio signal waveform to provide relevant data for the audio signal waveform.

In some implementations, acoustic parameters for each word in the voice query 304 are identified. For example, the volume for a particular word can be determined from the peak amplitude of the section of the waveform that corresponds to the particular word. Alternatively, the volume can be an average of the amplitudes in the section of the waveform that corresponds to the particular word. The frequency for a particular word can be determined as the maximum or minimum frequency measurement that corresponds to the section of the waveform that corresponds to the particular word. Alternatively, the frequency can be determined as an average of the discrete frequencies measured from the section of the audio signal waveform that corresponds to the particular word. Additionally, the time duration between the particular word and the word immediately before or after the particular word in voice query 304 can be identified from the section of audio signal waveform that is between the section corresponding to the particular word and the sections corresponding to the word immediately before or after the particular word. Also, the time duration for the particular word can be identified from the section of the audio signal waveform that corresponds to the particular word. The identified acoustic parameters for each word in the voice query 304 are associated with the text of the corresponding word. The text of voice query 304 and the associated acoustic parameters for each word in the text are transmitted to stress determination module 310. One advantage of obtaining acoustic parameters for each word is that it can allow comparison of acoustic parameters between different words within voice query 304.

The stress determination module 310 determines a stress score based on the parameters. The stress score indicates how likely it is that the pronoun in voice query 304 was stressed by the speaker. For example, the stress determination module 310 can provide the acoustic parameters determined by acoustic parameters module 308 to a machine learning system that has been trained to generate stress scores in a way that provides representative stress scores based on analyzing acoustic parameters. The provided acoustic parameters can be acoustic parameters identified for just the pronoun or acoustic parameters identified for a combination of words in voice query 304. The machine learning system applies weights learned during the training process to the acoustic parameters and outputs a stress score.

In some implementations, the acoustic parameters for the pronoun are absolute measures of the acoustic parameters for the pronoun. The absolute measures are determined directly from the section of the waveform that corresponds to the pronoun as described above. In other implementations, the acoustic parameters for the pronoun are relative measures of the acoustic parameters for the pronoun. The relative measures are derived from the acoustic parameters for the pronoun and the acoustic parameters for the other words in verbal query 304, as identified from their respective sections of the waveform as described above. The relative measures can be a ratio between the acoustic parameters for the pronoun and the acoustic parameters for the other words in voice query 304.

For example, if the absolute measure for the volume of the pronoun is 80 dB and the average volume for the other words in voice query 304 is 60 db, the ratio of the volumes is 1.33. This relative volume measure for the pronoun indicates that the volume of the pronoun is 33% greater than the volume of the rest of voice query 304. Alternatively, the relative measures can be a difference between the acoustic parameters for the pronoun and the acoustic parameters for the other words in voice query 304. For example, if the absolute measure for the time duration of the pronoun is 80 ms and the average time duration of the other words in voice query 304 is 50 ms, the difference in the time duration is 30 ms. This relative time duration measure for the pronoun indicates that the time duration of the pronoun is 30 ms more than the average time duration for the words in voice query 304. Alternatively, the relative measures of the acoustic parameters for the pronoun can be relative to the acoustic parameters for only the words that immediately proceed and follow the pronoun.

Concept association module 312 receives the stress score output by stress determination module 310. Based on the stress score, concept association module 312 disambiguates the pronoun in voice query 304 by identifying a concept represented by the pronoun and associating the concept with the pronoun, as described in more detail below with reference to FIG. 4. A resolved query 306 is generated from the identified concept and voice query. In some implementations, the voice query 304 can be modified to include the identified concept. For example, the pronoun in voice query 304 can be replaced with the identified concept. Alternatively, the concept can be added to voice query 304. In either case, once the pronoun has been integrated into voice query 304, it is available when voice query 304 is used as part of a search and hence the search process has available disambiguated information that allows it to search for an explicit concept that is of specific interest rather than trying to find an ambiguous pronoun.

Figure 4:
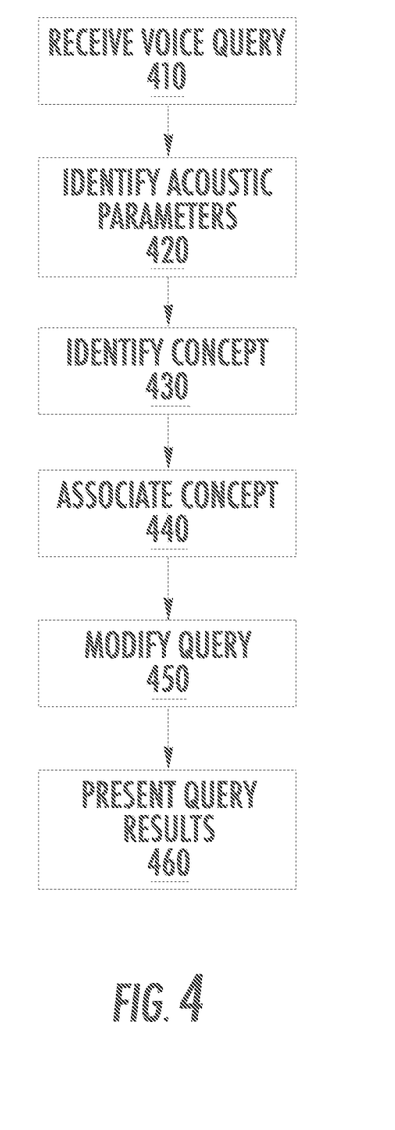
FIG. 4 illustrates an example method of associating a concept with a pronoun based on acoustic parameters and prior queries.

FIG. 4 illustrates an example method of associating a concept with a pronoun. For convenience, the example method 400 will be described in reference to a system that performs method 400. The system can be, for example, the pronoun resolution system described above with reference to FIG. 1 and FIG. 3. In some implementations, the system can be one or more computers.

In stage 410, the system receives an original voice query. As previously discussed, the receipt of the original voice query may occur at client device 104. For example, user 102 may articulate a voice query 304 that is received by a microphone at client device 104 by a microphone. Subsequently, text conversion module 314 may convert voice query 304 into a transcribed query for use in the search process.

In stage 420, the system identifies a plurality of acoustic parameters associated with a pronoun included in the original voice query. For example, after voice query 304 has been transcribed by text conversion module 314, acoustic parameters module 308 may operate as discussed above to establish acoustic parameters for query 304. The specifics of how acoustic parameters are obtained and used have been discussed in greater detail in the discussion of FIG. 3, above.

In stage 430, the system identifies a concept represented by the pronoun based on the plurality of acoustic parameters, wherein the concept is derived from a particular query of one or more earlier queries received before receiving the original voice query. For example, pronoun resolution system 302 may provide a transcribed version of query 304 and information about associated acoustic parameters to stress determination module 310. Based on results from stress determination module 310, as well as other analysis, concept association module 312 may operate so as to ascertain which concept is most relevant to the pronoun. Examples of how this process may occur have been presented above in the discussion of FIGS. 2A-2B.

In stage 440, the system associates the concept with the pronoun. As discussed above, this stage occurs such that concept association module 312 indicates that the pronoun in query 304 actually refers to a specific concept based on analysis of the acoustic parameters of query 304 as well as information such as concepts from other queries.

The method may also include certain optional stages.

In stage 450, the system modifies the query to include the concept. This stage is an extension of stage 440 in that stage 440 indicates that there is a relationship between the pronoun and the concept. In stage 450, the concept is actually integrated into the query itself. In this case, what occurs is that either the concept replaces the pronoun, or the concept is added as an alternative to the pronoun. For example, suppose that an implementation receives the query, "What is HIS birthday?" and establishes that "HIS" stands for "Alexander Graham Bell." In this stage, concept association module 312 may produce a received query that is either "What is Alexander Graham Bell's birthday?" or alternatively, "What is (HIS or Alexander Graham Bell's) birthday?" Here, one key factor is that the concept that is associated with the pronoun is now an actual part of the query.

In stage 460, the system presents results based on the query. Generally, search engine 116 receives received query 306, which now includes information about the concept such that received query 306 is no longer ambiguous. Thus, search engine 116 can search based on received query 306. That search produces query results 124, which may be provided by client device 104 to user 102. The system can cause the query results to be presented on a display screen associated with a user device or cause sound describing the one or more query results to be presented through a speaker associated with user device.

Other implementations include additional and alternative features relative to the implementation presented in FIG. 4. In some implementations, the system can receive multiple voice queries before receiving the original voice query. The system can be, for example, an Internet search engine, or other system, that takes action or identifies answers based on the voice queries or a question and answer system that provides direct answers to the voice queries. The system can respond to the prior queries by presenting query results or answers in response to the prior queries. A concept can be derived for each query and query result pair. The concept can be a person, place, or thing.

For example, before receiving the original voice query, the user can first present a voice query, "Who invented the telephone?" In response, the system provides the answer, "Alexander Graham Bell invented the telephone." From the query "Who invented the telephone?" and the answer "Alexander Graham Bell invented the telephone," the system can derive "Alexander Graham Bell" as the concept for the query. Subsequently, the user can present a follow-up voice query, "Who was Alexander Graham Bell's father?" In response, the system provides the answer, "Alexander Graham Bell's father is Alexander Melville Bell." From the query "Who was Alexander Graham Bell's father?" and the answer "Alexander Graham Bell's father is Alexander Melville Bell," the system can derive "Alexander Melville Bell" as the concept for the query. The system then receives the original voice query containing a pronoun. The pronoun in the received original query references a derived concept of one of the queries received by the system before receiving the original voice query.

In some implementations, the system can receive a single voice query before receiving the original voice query. The system can respond to the query by presenting a query result or answer in response to the query. A concept can be derived for both the query and query result or answer. For example, before receiving the original voice query, the user can present a voice query, "Who is Alexander Graham Bell's father?" The system can derive "Alexander Graham Bell" as the concept for the query. In response to the query, the system provides the answer, "Alexander Melville Bell." The system can derive "Alexander Melville Bell" as the concept for the answer. The system then receives the original voice query containing a pronoun. The pronoun in the received original query references a derived concept of either the query received before the original query or the answer for the query received before the original query.

The identified concept is associated with one of the earlier voice queries received before the original voice query or answers for the earlier voice queries as described above. Analysis of the original voice query indicates a degree of stress the user placed on the pronoun when speaking the original voice query. If the stress score satisfies a predetermined threshold, then it is determined that the pronoun was stressed. In response to determining that the pronoun was stressed, the system identifies the most recently derived concept as the concept represented by the pronoun. For example, the identified concept can be the concept derived from the most recent of the one or more earlier queries. Alternatively, the identified concept can be the most recently derived concept for a query and query answer pair for a query received by the system before the original voice query. The identified concept can be the concept derived from the query answer. If the stress score does not satisfy a predetermined threshold, then it is determined that pronoun was not stressed. In response to determining that the pronoun was not stressed, the system identifies a concept derived before the most recently derived concept as the concept represented by the pronoun. For example, the identified concept can be the concept derived from a query that preceded the most recent of the one or more earlier queries. Alternatively, the identified concept can be the earlier derived concept for a query and query answer pair for a query received by the system before the original query. The identified concept can be the concept derived from the query.

In some implementations, the system identifies a concept represented by the pronoun based on the gender that the pronoun references. Gender-specific pronouns can be used to help identify the concept. For example, the user can present a voice query, "Who is Alexander Graham Bell's mother?" The system can derive "Alexander Graham Bell" as the concept for the query. In response to the query, the system provides the answer, "Eliza Grace Symonds Bell." The system can derive "Eliza Grace Symonds Bell" as the concept for the answer. The system then receives the original voice query, "When is her birthday?" The system can recognize that the "her" in the original voice query is a female-specific pronoun and identify a female related concept of the previously derived concepts as the concept represented by the pronoun. The system can determine that of the identified concepts, only "Eliza Grace Symonds Bell" is a female related concept and identifies "Eliza Grace Symonds Bell" as the concept represented by the pronoun. The system can determine the gender of a concept using a trained machine learning system. The concept can be provided to the trained machine learning system to output a gender score that represents a gender determination for the concept.

In some implementations, the system identifies a concept represented by the pronoun based on both the gender that the pronoun references and the stress determination for the pronoun. For example, if both the stress score and the gender score for the pronoun indicate that the pronoun refers to the same concept, then the system identifies that concept as the concept represented by the pronoun. If the stress score and the gender score for the pronoun indicate that the pronoun refers to different concepts, the system makes a determination on which score to rely on. For example, the system can choose to rely on the score with the greater confidence level. Alternatively, the system can always rely on just the stress score or just the gender score when the two scores indicate different concepts for the pronoun.

An implementation may also use machine learning to train stress determination module 310 to improve the results of stress scoring. The system receives data comprising a plurality of voice queries containing pronouns, stress values for each of the plurality of voice queries, and acoustic parameters for each of the plurality of voice queries. For example, the data can be collected by presenting the voice queries to one or more human raters. The human raters can provide stress values for each of the presented voice queries. The stress value indicates a level of emphasis placed on the pronoun in the presented voice queries as determined by the human raters. In some implementations, the provided stress values range in value from −1 to 1. Various ranges can alternatively be used. In other implementations, the provided stress values can be 0 or 1, indicating that the pronoun is either stressed or not stressed. The system can identify the plurality of acoustic parameters for one or more words in the voice queries as described above in reference to FIG. 3. The acoustic parameters can include, for example, at least two of volume, pitch, frequency, duration between each spoken word, and spoken duration. Other acoustic parameters can also be used.

Alternatively, the data can be collected by having one or more human raters speak the plurality of voice queries. The system can identify the acoustic parameters of each spoken voice query, and ask the human rater to also provide a stress value indicating the level of stress the human rater placed on the pronoun in the spoken voice query.

The system trains a machine learning system using the received data, for example, using conventional techniques. For example, the data can be transformed into a plurality of feature vectors for each voice query. Each feature vector for a voice query represents the data describing the acoustic parameters for the voice query. A learning algorithm analyzes the training data comprising of the feature vectors and stress value for each voice query in the machine learning system to determine the appropriate weights for each of the acoustic parameters.

The machine learning system described above is trained to output stress scores that represent a level of stress placed on a pronoun in a voice query based on the acoustic parameters of the voice query. This stress score is then used by the system to identify a concept represented by the pronoun, as described above in reference to FIG. 4.

Figure 5:
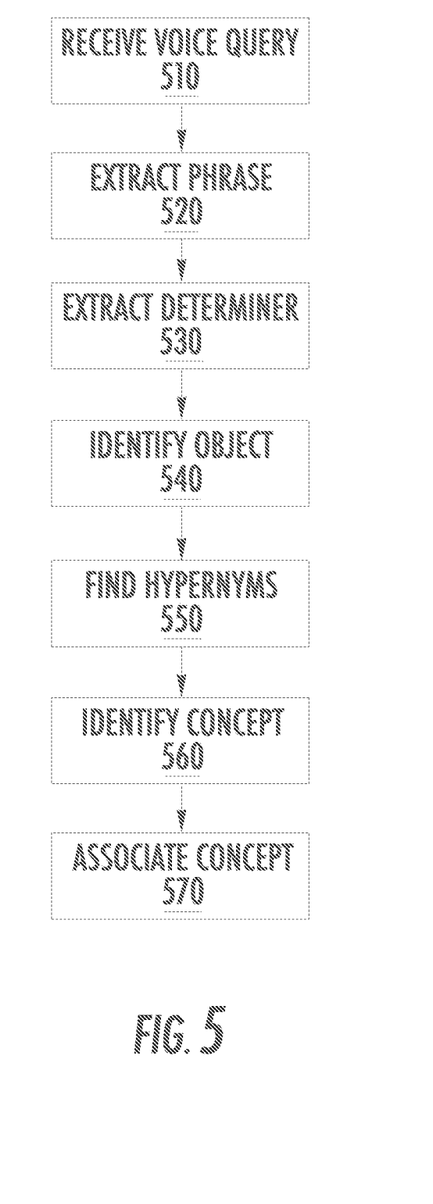
FIG. 5 illustrates an example method for associating a concept with a pronoun based on grammatical analysis.

FIG. 5 illustrates an example method for associating a concept with a pronoun based on grammatical analysis.

Stage 510 includes receiving an original voice query after having received one or more earlier voice queries, wherein the original voice query includes a phrase that refers to a concept from one of the earlier voice queries. This stage is similar to stage 410 in that user 102 provides client device 104 with audio that may be transcribed by text conversion module 314 into a textual query. However, in stage 510 the query includes a phrase that refers to a concept. For example, user 102 might have previously issued a query to which the answer was, "Laphroaig." The original voice query might be a follow up query, asking, "What drinks can I make with that tasty scotch?"

Here "that tasty scotch" is an entire phrase that refers to "Laphroaig," a particular brand of scotch. However, "that tasty scotch" is stateful, in that it only makes sense with reference to "Laphroaig" from the previous query. The implementation of FIG. 5 operates so as to identify "that tasty scotch" and replace it with "Laphroaig," thereby rendering the query stateless.

Stage 520 includes analyzing the grammatical structure of the original query to extract the phrase that refers to a concept from one of the earlier voice queries. For example, this stage may be performed by concept association module 312. Analyzing the grammatical structure may establish which phrase is a concept by using part-of-speech tagging and identifying dependency information. For example, "what drinks can I make with that tasty scotch" might ascertain parts of speech and further use this information to establish that the phrase to clarify is "that tasty scotch."

Stage 530 includes extracting a determiner word from the phrase. For example, this stage may be performed by concept association module 312. Here, "that" is the relevant determiner word.

Stage 540 includes identifying an object word of the determiner word from the phrase. For example, this stage may be performed by concept association module 312. Here, "scotch" is the object of that.

Stage 550 includes finding a set of hypernyms for the object word. For example, this stage may be performed by concept association module 312. For example, this set might determine that scotch "is-a" "liquor", "spirit", "whiskey", "drink" and so forth. For example, this stage may be facilitated using an appropriate lookup table.

Stage 560 includes identifying a concept represented by the phrase, wherein the concept is derived from a particular query of the one or more earlier queries, by comparing the one or more earlier queries to the phrase and the set of hypernyms. For example, this stage may be performed by concept association module 312. Essentially, this stage includes using a variety of heuristics to establish how similar concepts from previous queries are to the phase. In this example, "Laphroaig" is an answer to an earlier query. For example, user 102 might have asked, "What is my favorite alcoholic beverage?" and search engine 116 may have retrieved "Laphroaig" as the answer. Since "scotch" is the object of "that", and is further modified by "tasty," an implementation may be able to identify that "scotch," especially "tasty scotch," falls into many overlapping categories with "Laphroaig." For example, both might have as a hypernym "spirit." Various heuristics may be used to discriminate between specific candidate concepts, when multiple plausible candidate concepts are available. For example, heuristics may include factors such as term distance, numbers of shared hypernyms, longest terms, or other factors that may indicate a likelihood that a concept is likely to be a helpful replacement for the phrase.

Stage 570 includes associating the concept with the phrase. This stage is carried out in a manner similar to stage 440. It may be noted that stage 570 may be followed appropriately by incorporating the concept into the query and searching based on the query by stages that are similar to stage 450 and 460.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A computer-implemented method comprising,
    receiving, by a server, a particular voice query that is based on an utterance of a user that was detected by a microphone of a device that is located remotely from the server;
    determining, by the server, that at least a portion of the voice query includes a phrase that refers to a concept related to at least one query of a plurality of other queries that were received by the server before the particular voice query;
    obtaining, by the server, the phrase that refers to the concept;
    determining, by the server, that the phrase includes a determiner word;
    identifying, by the server, an object word of the determiner word;
    determining, based on the identified object word, a set of hypernyms for the object word;
    determining, by the server, a value that reflects a level of similarity between the obtained portion of the particular voice query and each of the plurality of queries that were previously received by the server, wherein determining the value comprises:
        comparing the obtained phrase and the set of hypernyms to each of the plurality of queries, and
        determining, based on the comparison of the obtained phrase and the set of hypernyms to each of the plurality of queries, a value that reflects a level of similarity between the obtained portion of the particular voice query and each of the plurality of queries that were previously received;
    identifying, by the server and based on the determined value that reflects the level of similarity, a first query of the plurality of queries; and
    generating, by the server, a data structure that includes data representing an association between the concept of the first query and the particular voice query.

2. The method of claim 1, wherein determining, by the server, a value that reflects a level of similarity between the obtained portion of the particular voice query and each of the plurality of queries that were previously received by the server further comprises:
    comparing the obtained phrase to each of the plurality of queries; and
    determining, based on the comparison of the obtained phrase to each of the plurality of queries, a value that reflects a level of similarity between the obtained portion of the particular voice query and each of the plurality of queries that were previously received.

3. The method of claim 1, wherein comparing the obtained phrase and the set of hypernyms to each of the plurality of queries comprises:
    for each query of the plurality of queries:
        evaluating one or more factors that includes respective distance between terms of the obtained phrase and distance between terms of the query, a number of shared hypernyms between the obtained phrase and the query, or a longest term of the obtained phrase to a longest term of the query.

4. The method of claim 1, wherein generating, by the server, a data structure that includes data representing an association between the concept of the first query with the particular voice query comprises:
    generating, by the server, a second search query that is based on the concept of the first query and the particular query.

5. The method of claim 4, the method further comprising:
    executing, by the server, a search of one or more databases using the generated second query;
    generating, by the server, one or more search results that are responsive to the executed search; and
    providing, by the server, data describing the one or more search results to the device for output by the device using the speaker of the device.

6. A system comprising:
    one or more computers and one or more storage devices storing instructions that are operable, when executed by one or more computers, to cause the one or more computers to perform the operations comprising:
        receiving, by a server, a particular voice query that is based on an utterance of a user that was detected by a microphone of a device that is located remotely from the server;
        determining, by the server, that at least a portion of the voice query includes a phrase that refers to a concept related to at least one query of a plurality of other queries that were received by the server before the particular voice query;
        obtaining, by the server, the phrase that refers to the concept;
        determining, by the server, that the phrase includes a determiner word;
        identifying, by the server, an object word of the determiner word;
            determining, based on the identified object word, a set of hypernyms for the object word;
        determining, by the server, a value that reflects a level of similarity between the obtained portion of the particular voice query and each of the plurality of queries that were previously received by the server, wherein determining the value comprises:
            comparing the obtained phrase and the set of hypernyms to each of the plurality of queries, and determining, based on the comparison of the obtained phrase and the set of hypernyms to each of the plurality of queries, a value that reflects a level of similarity between the obtained portion of the particular voice query and each of the plurality of queries that were previously received;

identifying, by the server and based on the determined value that reflects the level of similarity, a first query of the plurality of queries; and generating, by the server, a data structure that includes data representing an association between the concept of the first query and the particular voice query.

7. The system of claim 6, wherein determining, by the server, a value that reflects a level of similarity between the obtained portion of the particular voice query and each of the plurality of queries that were previously received by the server further comprises:

comparing the obtained phrase to each of the plurality of queries; and determining, based on the comparison of the obtained phrase to each of the plurality of queries, a value that reflects a level of similarity between the obtained portion of the particular voice query and each of the plurality of queries that were previously received.

8. The system of claim 6, wherein comparing the obtained phrase and the set of hypernyms to each of the plurality of queries comprises:

for each query of the plurality of queries:
  evaluating one or more factors that includes respective distance between terms of the obtained phrase and distance between terms of the query, a number of shared hypernyms between the obtained phrase and the query, or a longest term of the obtained phrase to a longest term of the query.

9. The system of claim 6, wherein generating, by the server, a data structure that includes data representing an association between the concept of the first query with the particular voice query comprises:

generating, by the server, a second search query that is based on the concept of the first query and the particular query.

10. The system of claim 9, the operations further comprising:

executing, by the server, a search of one or more databases using the generated second query;

generating, by the server, one or more search results that are responsive to the executed search; and providing, by the server, data describing the one or more search results to the device for output by the device using the speaker of the device.

11. A computer-readable storage device having stored thereon instructions, which, when executed by data processing apparatus, cause the data processing apparatus to perform operations comprising:

receiving, by a server, a particular voice query that is based on an utterance of a user that was detected by a microphone of a device that is located remotely from the server;

determining, by the server, that at least a portion of the voice query includes a phrase that refers to a concept related to at least one query of a plurality of other queries that were received by the server before the particular voice query;

obtaining, by the server, the phrase that refers to the concept;

determining, by the server, that the phrase includes a determiner word;

identifying, by the server, an object word of the determiner word;

determining, based on the identified object word, a set of hypernyms for the object word;

determining, by the server, a value that reflects a level of similarity between the obtained portion of the particular voice query and each of the plurality of queries that were previously received by the server, wherein determining the value comprises:

comparing the obtained phrase and the set of hypernyms to each of the plurality of queries, and determining, based on the comparison of the obtained phrase and the set of hypernyms to each of the plurality of queries, a value that reflects a level of similarity between the obtained portion of the particular voice query and each of the plurality of queries that were previously received;

identifying, by the server and based on the determined value that reflects the level of similarity, a first query of the plurality of queries; and generating, by the server, a data structure that includes data representing an association between the concept of the first query and the particular voice query.

12. The computer-readable storage device of claim 11, wherein determining, by the server, a value that reflects a level of similarity between the obtained portion of the particular voice query and each of the plurality of queries that were previously received by the server further comprises:

comparing the obtained phrase to each of the plurality of queries; and determining, based on the comparison of the obtained phrase to each of the plurality of queries, a value that reflects a level of similarity between the obtained portion of the particular voice query and each of the plurality of queries that were previously received.

13. The computer-readable storage device of claim 11, wherein comparing the obtained phrase and the set of hypernyms to each of the plurality of queries comprises:

for each query of the plurality of queries:
  evaluating one or more factors that includes respective distance between terms of the obtained phrase and distance between terms of the query, a number of shared hypernyms between the obtained phrase and the query, or a longest term of the obtained phrase to a longest term of the query.

14. The computer-readable storage device of claim 11, wherein generating, by the server, a data structure that includes data representing an association between the concept of the first query with the particular voice query comprises:

generating, by the server, a second search query that is based on the concept of the first query and the particular query;

wherein the operations further comprise:
  executing, by the server, a search of one or more databases using the generated second query;
  generating, by the server, one or more search results that are responsive to the executed search; and
  providing, by the server, data describing the one or more search results to the device for output by the device using the speaker of the device.

* * * * *